United States Patent
Fernandez Gomez et al.

(10) Patent No.: US 10,465,411 B2
(45) Date of Patent: Nov. 5, 2019

(54) ASSEMBLY PROCESS OF A TELESCOPIC TOWER

(71) Applicants: Miguel Angel Fernandez Gomez, Madrid (ES); Jose Emilio Jimeno Chueca, Madrid (ES)

(72) Inventors: Miguel Angel Fernandez Gomez, Madrid (ES); Jose Emilio Jimeno Chueca, Madrid (ES)

(73) Assignee: ESTEYCO S.A.P., Madrid (ES)

( * ) Notice: Subject to any disclaimer, the term of this patent is extended or adjusted under 35 U.S.C. 154(b) by 0 days.

(21) Appl. No.: 14/363,421

(22) PCT Filed: Dec. 10, 2012

(86) PCT No.: PCT/EP2012/074996
§ 371 (c)(1),
(2) Date: Jun. 6, 2014

(87) PCT Pub. No.: WO2013/083852
PCT Pub. Date: Jun. 13, 2013

(65) Prior Publication Data
US 2014/0311085 A1    Oct. 23, 2014

(30) Foreign Application Priority Data
Dec. 9, 2011 (ES) .................................. 201131990

(51) Int. Cl.
*E04H 12/34* (2006.01)
*E04H 12/12* (2006.01)
(Continued)

(52) U.S. Cl.
CPC ......... *E04H 12/342* (2013.01); *E02B 17/021* (2013.01); *E04H 12/00* (2013.01);
(Continued)

(58) Field of Classification Search
CPC ... E04H 12/182; E04H 12/342; E04H 12/185; E04H 12/34; E04H 12/12; F03D 1/001; F05B 2240/9151; E02B 17/021
See application file for complete search history.

(56) References Cited

U.S. PATENT DOCUMENTS 1,319,943 A * 10/1919 Bessolo .......................... 182/129
1,721,020 A *  7/1929 Hayman .......................... 52/121
(Continued)

FOREIGN PATENT DOCUMENTS

| AT | 296130 B | * | 1/1972 |
| CH | 362205 A | * | 5/1962 |

(Continued)

OTHER PUBLICATIONS

Some of the above references were cited in the International Search Report of the corresponding International Application, PCT/EP2012/074996 dated May 10, 2013.

*Primary Examiner* — Joshua J Michener
*Assistant Examiner* — Charissa Ahmad
(74) *Attorney, Agent, or Firm* — Cowan, Liebowitz & Latman, P.C.; Mark Montague

(57) ABSTRACT

Assembly process of a telescopic tower (100) including at least one prefabricated concrete section, comprising the following steps: providing sections (2,4,6,8,10) in an initial position wherein superimposed sections are disposed coaxially within a base section (10); providing assembly means (14,16,18); providing operator support means (20) on the external surface of said base section (10) essentially vertically in correspondence with the upper edge of said base section (10); lifting the innermost superimposed section (2,4,6,8) radially from those that are in the initial position forming a joint between the lower end portion of said superimposed section (2,4,6,8) which is being lifted and the upper end portion of the radially external and immediately (Continued)

adjacent section (4,6,8,10); providing in said joint anchoring devices for immobilizing at least provisionally the corresponding sections (2,4,6,8,10) between one another.

6 Claims, 4 Drawing Sheets

(51) Int. Cl.
*E04H 12/18* (2006.01)
*E04H 12/00* (2006.01)
*E02B 17/02* (2006.01)
*F03D 13/25* (2016.01)
*E02B 17/00* (2006.01)

(52) U.S. Cl.
CPC ........... *E04H 12/12* (2013.01); *E04H 12/182* (2013.01); *E04H 12/34* (2013.01); *F03D 13/25* (2016.05); *E02B 2017/0073* (2013.01); *E02B 2017/0091* (2013.01); *F05B 2240/912* (2013.01); *F05B 2240/9151* (2013.01); *F05B 2240/95* (2013.01); *Y02E 10/727* (2013.01); *Y02E 10/728* (2013.01)

(56) References Cited

U.S. PATENT DOCUMENTS

| | | | | |
|---|---|---|---|---|
| 2,583,072 | A * | 1/1952 | Wilson | E21B 15/00 403/379.5 |
| 2,632,530 | A * | 3/1953 | Wagner | 187/226 |
| 2,730,207 | A * | 1/1956 | Hall | 52/115 |
| 3,248,831 | A * | 5/1966 | Jones | 52/121 |
| 3,672,115 | A * | 6/1972 | Abe | E04H 12/34 212/176 |
| 3,688,455 | A * | 9/1972 | Zebuhr | E04H 12/182 343/883 |
| 3,958,376 | A * | 5/1976 | Campbell | 52/115 |
| 4,176,360 | A * | 11/1979 | Leavy et al. | 343/883 |
| 4,580,377 | A * | 4/1986 | Sundin | 52/121 |
| 4,663,900 | A * | 5/1987 | Rehm et al. | 52/115 |
| 4,714,021 | A * | 12/1987 | Tranin | 102/401 |
| 4,934,872 | A * | 6/1990 | Klausen | E02B 17/027 405/195.1 |
| 5,035,094 | A * | 7/1991 | Legare | 52/118 |
| 5,101,215 | A * | 3/1992 | Creaser, Jr. | 343/883 |
| 5,485,700 | A * | 1/1996 | Van Vranken | 52/40 |
| 8,381,460 | B1 * | 2/2013 | McDermott | E01D 21/00 52/117 |
| 8,661,744 | B2 * | 3/2014 | Keller | 52/118 |
| 2003/0213765 | A1 * | 11/2003 | St-Germain | 212/294 |
| 2004/0169376 | A1 * | 9/2004 | Ruer et al. | 290/55 |
| 2004/0211148 | A1 * | 10/2004 | Foust et al. | 52/720.1 |
| 2005/0150721 | A1 * | 7/2005 | Fujiwara | D21C 7/00 182/48 |
| 2006/0120809 | A1 * | 6/2006 | Ingram et al. | 405/195.1 |
| 2008/0203246 | A1 * | 8/2008 | Ingram et al. | 248/74.1 |
| 2008/0236060 | A1 * | 10/2008 | Battaglia | 52/121 |
| 2009/0145056 | A1 * | 6/2009 | Pereira | 52/111 |
| 2009/0249904 | A1 * | 10/2009 | Chen et al. | 74/89.23 |
| 2009/0249905 | A1 * | 10/2009 | Chen et al. | 74/89.37 |
| 2009/0249906 | A1 * | 10/2009 | Chen et al. | 74/89.37 |
| 2011/0067353 | A1 * | 3/2011 | Tadayon | F03D 1/001 52/745.18 |
| 2011/0279347 | A1 * | 11/2011 | Pass et al. | 343/890 |
| 2013/0091784 | A1 * | 4/2013 | Schmidt | 52/115 |

FOREIGN PATENT DOCUMENTS

| | | | | |
|---|---|---|---|---|
| DE | 2448246 | A1 * | 4/1976 | |
| DE | 2628029 | A1 * | 12/1977 | |
| DE | 3434517 | A1 * | 3/1986 | ............ E04H 12/18 |
| DE | 202006011099 | U1 | 7/2007 | |
| EP | 0201645 | B1 * | 2/1992 | |
| ES | 2362730 | T | 7/2011 | |
| FR | 630031 | A * | 11/1927 | |
| FR | 2247579 | A1 * | 5/1975 | |
| FR | 2446907 | A1 * | 8/1980 | |
| GB | 970879 | A * | 9/1964 | |
| GB | 2365905 | A * | 2/2002 | ............ E02B 17/02 |
| GB | 2398543 | A * | 8/2004 | ............ E02B 17/02 |
| GB | 2497921 | A * | 7/2013 | |
| WO | WO 0183290 | A1 * | 11/2001 | |
| WO | 0246552 | A1 | 6/2002 | |
| WO | WO 2005028781 | A2 * | 3/2005 | |
| WO | WO 2009144439 | A1 * | 12/2009 | ............ E04H 12/18 |
| WO | 2011006526 | A1 | 1/2011 | |
| WO | 2011007065 | A1 | 1/2011 | |

* cited by examiner

ASSEMBLY PROCESS OF A TELESCOPIC TOWER

CROSS REFERENCE TO RELATED APPLICATIONS

This is a U.S. national phase of International Patent Application No. PCT/EP2012/074996, filed on Dec. 10, 2012. Priority under 35 U.S.C. § 119(a) and 35 U.S.C. § 365(b) is claimed from Spanish Patent Application No. P201131990, filed on Dec. 9, 2011.

FIELD OF THE INVENTION

The present invention relates to an assembly process of a telescopic tower, especially an assembly process of a telescopic tower including at least one prefabricated concrete section, for example a telescopic tower of prefabricated concrete sections designed to support a wind turbine.

Therefore, the main sector of application of the present invention is the construction industry, especially in concrete, in combination with the renewable or green energy industry, specifically wind power.

BACKGROUND OF THE INVENTION

The use is known of towers formed from at least two sections, including at least one prefabricated section with the purpose of supporting a wind turbine at a great height. It is also known that said sections can be modular, being generally composed of pieces in the form of tile or segments that form a tapered or truncated cone-shaped cylindrical section. The total height of a tower will be distributed between the different sections in any possible combination, i.e. all sections can have the same height, some sections may have the same height, all sections may have different heights from one another, etc.

Telescopic towers have recently become known, formed from at least two coaxial sections of different diameter, optionally formed by segments.

Nevertheless, the assembly processes known for these recently introduced telescopic towers are still not totally optimized.

For example, document WO 2011/006526 A1 discloses an assembly process based on disposing, on the one hand, cables or tendons which connect the upper edge of each section with the lower edge of the radially inner and immediately adjacent section and, on the other hand, traction means that act on said cables or tendons to lean on the upper edge of an outer section in assembled position and pulling from the lower edge of an inner section in folded position, thus lifting said inner section to its assembled position and with it the array of inner sections interconnected with cables, and so on and so forth until completing the lifting of all sections. This document also stipulates the disposal of an operator support platform inside the tower, which is progressively raised as the assembly of the tower progresses.

Bearing in mind that every time a lifting action is performed, operators have to work at the height of the joint between the upper end portion of the outer section and the lower end portion of the inner section to dispose in said joint anchoring devices to immobilize the corresponding sections between one another, this process forces the progressive rise in position of said operators and the means designed to house said operators, which can increase the number of actions associated with assembly of the tower and may lengthen the assembly time. Furthermore, the disposal of the platform inside the tower may enter in conflict with safety rules that prohibit the presence of operators under suspended loads.

SUMMARY OF THE INVENTION

To simplify, hereinafter in the description reference will be made to towers composed of said type of tapered or truncated cone-shaped cylindrical sections, although it will be understood that the towers can also be composed of sections of oval or polygonal plan or any other suitable form. Also to simplify, hereinafter it shall be understood that the position of a section is defined by the position of its axis of revolution, i.e. that a section is in vertical position if its axis of revolution is in vertical position, that a section is in horizontal position if its axis of revolution is in horizontal position, etc.

The object of the present invention is thus to provide an assembly process of a telescopic tower, especially an assembly process of a telescopic tower including at least one prefabricated concrete section, for example a telescopic tower of prefabricated concrete sections designed to support a wind turbine.

More specifically, the present invention proposes an assembly process of a telescopic tower including at least one prefabricated concrete section, comprising a base section and a plurality of superimposed sections, wherein the diameter of said base section is greater than the diameter of said superimposed sections, the assembly process comprising the following steps:

a) providing said sections in an initial position wherein said base section is vertically disposed resting on an assembly surface and said superimposed sections are disposed coaxially within said base section;

b) providing assembly means capable of selectively lifting said superimposed sections;

c) providing operator support means on the external surface of said base section essentially vertically in correspondence with the upper edge of said base section;

d) lifting the innermost superimposed section radially from those that are in the initial position, by said assembly means, to an assembly position wherein the lower end portion of said superimposed section which is being lifted is situated essentially vertically in correspondence with the upper end portion of the radially external and immediately adjacent section in relation to said section which is being lifted, forming in this way a joint between the lower end portion of said superimposed section which is being lifted and the upper end portion of the radially external and immediately adjacent section in relation to said section which is being lifted, said joint being thus situated essentially vertically in correspondence with said operator support means;

e) providing in said joint anchoring devices for immobilizing at least provisionally the corresponding sections between one another, by operators housed in said operator support means;

f) repeating steps d) and e) at least once.

The assembly process of a telescopic tower in accordance with the present invention can be carried out inversely (i.e. performing the actions opposite to those described in this step and performing the steps essentially in reverse order) in order to dismantle said telescopic tower.

As can be appreciated, the assembly process in accordance with the present invention stipulates the disposal of the operator support means in a point of the assembly process at a predetermined height and enables maintaining said operator support means at the same height during the remainder of the tower assembly process. Furthermore, the operator support means are disposed on the outside of the base section, which facilitates complying with the safety legislation that prohibits the presence of operators under suspended loads.

The process in accordance with the present invention can be carried out by the use of any assembly means such as, for example, a conventional moving external crane. Nevertheless, the use is preferred of assembly means which can be called "self-climbing", i.e. installed in the tower, such as sets of cables and jacks which lift the sections leaning on other sections, hydraulic jacks that push the sections upward, rack and pinion sets that push the sections upward or similar. The assembly means may even comprise different types of devices, the first section being lifted, for example, by means of a conventional moving external crane which has been used to dispose the sections in the initial position) and lifting the remaining sections using self-climbing devices.

The process in accordance with the present invention may involve guide means to guide the section which is being lifted along a predetermined trajectory, and said guide means may even include: at least one fixing member, fixed by a lower portion to the external surface of said base section so that it extends upward beyond the upper edge of said base section, at least one tensioning member which emerges from said fixing member in a position above the upper edge of said base section, and at least one displacement element disposed in the free end of said tensioning member; said tensioning member being disposed to press said displacement element against a superimposed section which is being lifted, and to guide the section in question throughout the desired trajectory. For example, said tensioning member may be of adjustable length so that it enables the guiding of sections of different diameter whilst maintaining said fixing members in the same position during the position during the process in accordance with the present invention.

BRIEF DESCRIPTION OF THE DRAWINGS

These and other characteristics and advantages of the present invention shall be revealed from the following description of an embodiment thereof, given only by way of non-limiting example, with reference to the attached drawings, wherein.

DETAILED DESCRIPTION OF THE INVENTION

Figure 1:
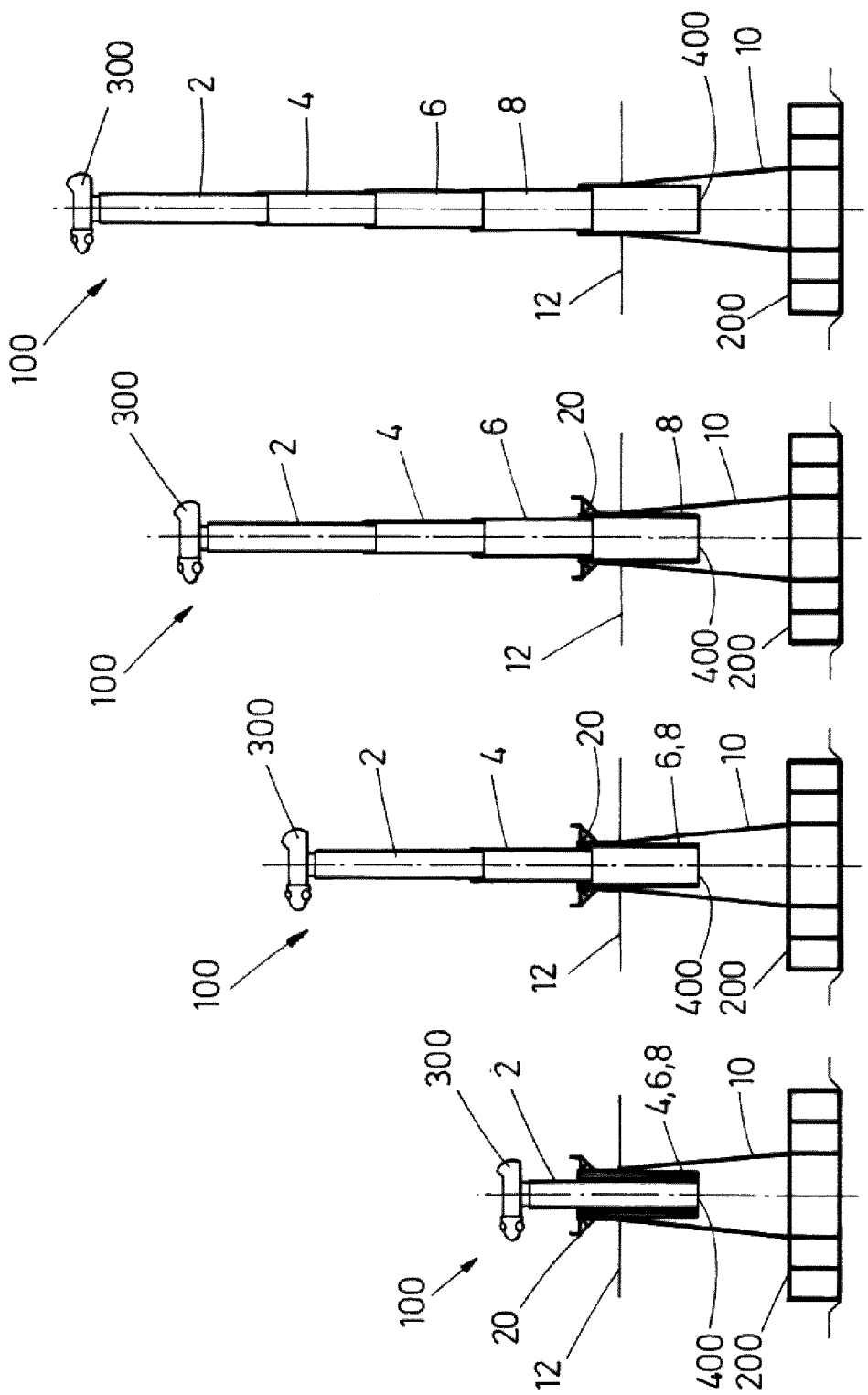
FIGS. 1A, 1B, 1C and 1D show schematic elevation views of a telescopic tower, illustrating different stages of a first embodiment of the process in accordance with the present invention.

The figures in the attached drawings are all symmetrical with respect to its central vertical axis, except for part 300. Therefore, in the interests of clarity, parts 14, 16, 18, 20, 22, 24 and 26 only refer to one side of said central vertical axis, understanding that the similar parts disposed on the other side of said central vertical axis share the same references.

With reference then to FIGS. 1A, 1B, 1C, 1D and 3, a telescopic tower 100 is illustrated that implements a first embodiment of the process in accordance with the present invention. Said telescopic tower 100 comprises a foundation with an upper assembly surface 200, a base section 10 and four superimposed sections 2, 4, 6, 8, a wind turbine 300 and a support structure 400 of sections internally fastened to said base section 10.

In this embodiment, the intermediate superimposed sections 4, 6, 8 all have straight cylinder form and the same length, the upper superimposed section 2 also has the form of a straight cylinder but it has a greater length than that of the intermediate superimposed sections 4, 6, 8, and the base section 10 has a truncated cone shape in a main lower portion and the form of a straight cylinder in the remaining portion, the total length of said base section 10 being larger than the length of said upper superimposed section 2.

Furthermore, in this embodiment, by way of non-limiting example, the tower 100 is an off-shore tower, so that FIGS. 1A, 1B, 1C, 1D and 3 illustrate a water surface line 12.

Figure 3:
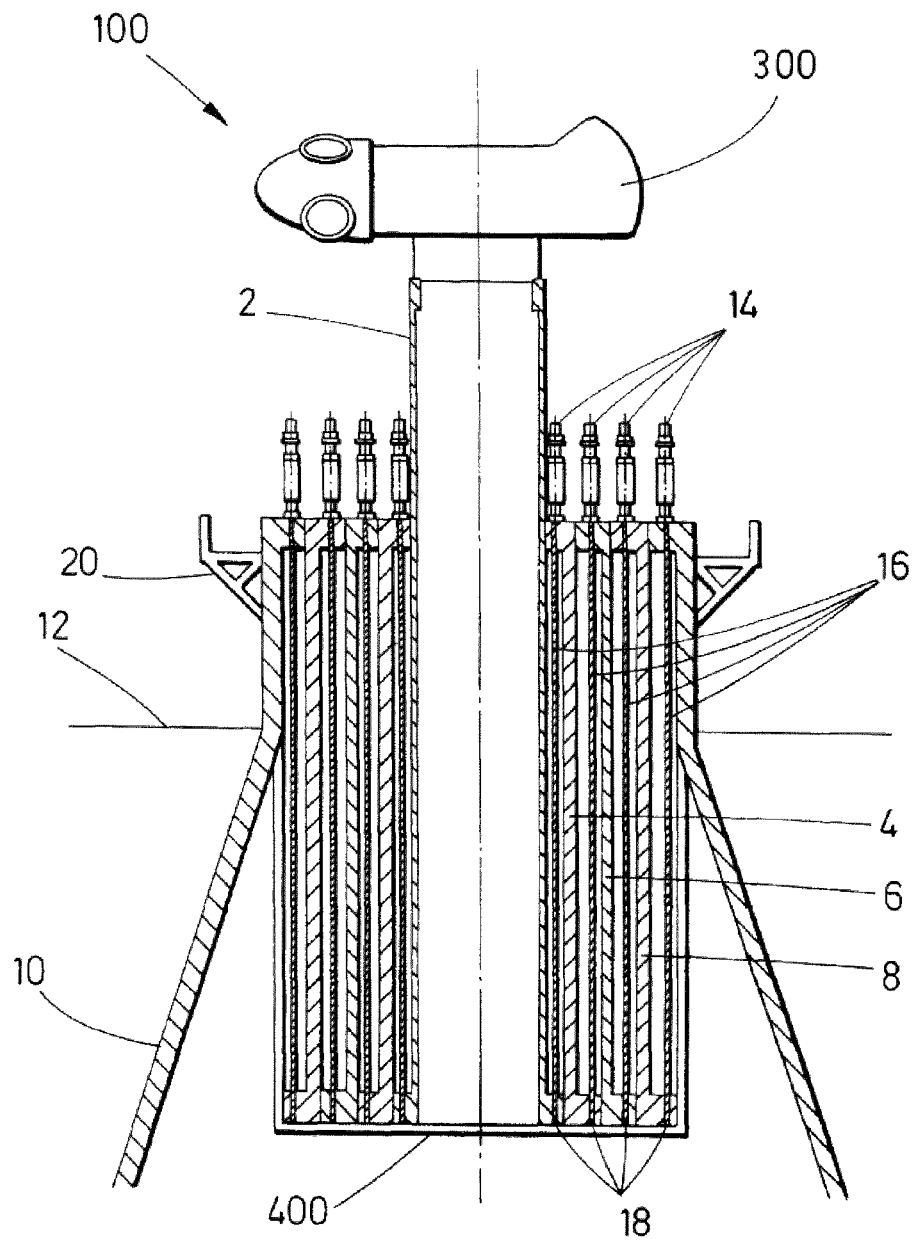
FIG. 3 shows an elevation view of a detail of FIG. 1A.

More specifically, after providing said sections 2, 4, 6, 8, 10 in an initial position wherein said base section 10 is vertically disposed resting on said assembly surface 200 and said superimposed sections 2, 4, 6, 8 are disposed coaxially within said base section 10, after providing assembly means 14, 16, 18 capable of selectively lifting said superimposed sections 2, 4, 6, 8, and after providing operator support means 20 on the external surface of said base section 10 essentially vertically in correspondence with the upper edge of said base section 10, all as shown in FIG. 1A and in the detail of FIG. 3, said superimposed sections 2, 4, 6, 8 are lifted.

In this embodiment, wherein the tower 100 is an off-shore tower, it is preferred that said operator support means 20 are disposed above the maximum sea level foreseen.

In accordance with the process of the present invention, the upper superimposed section 2 is first lifted followed by the superimposed section 4.

Specifically, FIG. 1B shows a stage in the process in accordance with this embodiment of the present invention wherein the upper superimposed section 2 has been totally lifted and immobilized to al superimposed section 4, the superimposed section 4 has been totally lifted, and has formed a joint between the lower end portion of said superimposed section 4 and the upper end portion of the superimposed section 6, radially external and immediately adjacent in relation to said superimposed section 4, said joint being positioned essentially vertically in correspondence with said operator support means 20.

FIG. 1C shows a later stage in the process in accordance with this embodiment of the present invention wherein the upper superimposed section 2 has been totally lifted and immobilized to the superimposed section 4, the superimposed section 4 has been totally lifted and immobilized to the superimposed section 6, the superimposed section 6 has been totally lifted, and a joint has been formed between the lower end portion of said superimposed section 6 and the upper end portion of the superimposed section 8, radially external and immediately adjacent in relation to said superimposed section 6, said joint being situated essentially vertically in correspondence with said operator support means 20.

Finally, the FIG. 1D shows a later stage of the process in accordance with this embodiment of the present invention wherein all the superimposed sections 2, 4, 6, 8 have been totally lifted and immobilized to the external and immediately adjacent section, 4, 6, 8, 10 respectively, the support means 400 of sections remaining empty. This process in accordance with an embodiment of the present invention includes an additional step of removing the operator support means 20, and may still include a further additional step of removing the support means 400 of sections and/or an additional step of removing the assembly means 14, 16, 18.

As can be seen in FIG. 3, in this embodiment said assembly means include, for each superimposed section 2, 4, 6, 8: two cables 16 which connect the lower end portion of each of said superimposed sections 2, 4, 6, 8 and the upper end portion of the radially external and immediately adjacent section, 4, 6, 8, 10 respectively; limiter means 18, in this embodiment a wedge and stop plate set containing the wedge, disposed in the lower end of each cable 16, to fix each of said cables 16 to each lower end portion; and traction means 14, in this embodiment a jack fixed in the upper end of each cable 16, to pull upward each cable 16 and this, in turn, each lower end portion. Said traction means 14 may comprise a plurality of jacks each installed in the upper end of each cable 16 (as shown) or may comprise a smaller number of jacks than cables, the available jacks being successively installed in the upper end of each cable 16. The basic concept of these means 14, 16, 18 is known in the state of the art, for example through said document WO 2011/006526 A1, and shall not be explained here in greater detail.

With reference now to FIGS. 2A, 2B, 2C, 2D and 4, the same telescopic tower 100 is illustrated that now implements a second embodiment of the process in accordance with the present invention. Said telescopic tower 100 thus comprises a foundation with an upper assembly surface 200, a base section 10 and four superimposed sections 2, 4, 6, 8, a wind turbine 300 and a support structure 400 of sections internally fastened to said base section 10.

In this embodiment, the intermediate superimposed sections 4, 6, 8 all have the form of a straight cylinder and the same length, the upper superimposed section 2 also has the form of a straight cylinder but has a length greater than that of the intermediate superimposed sections 4, 6, 8, and the base section 10 has a truncated cone shape in a main lower portion and the form of a straight cylinder in the remaining portion, the total length of said base section 10 being larger than the length of said upper superimposed section 2.

Furthermore, in this embodiment, by way of non-limiting example, the tower 100 is an off-shore tower, so that FIGS. 2A, 2B, 2C, 2D and 4 illustrate a water surface line.

Figure 2:
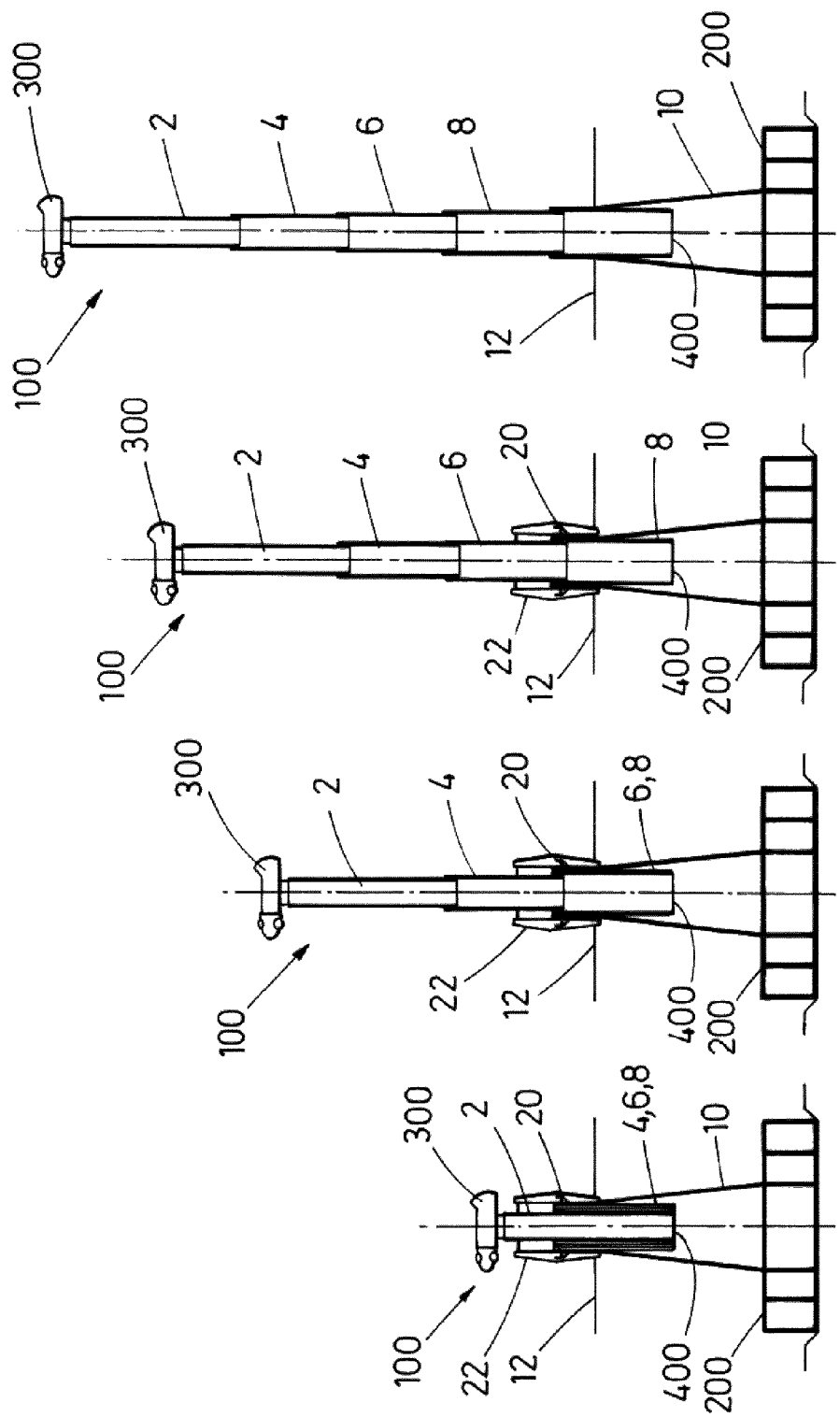
FIGS. 2A, 2B, 2C and 2D show schematic elevation views of a telescopic tower, illustrating different stages of a second embodiment of the process in accordance with the present invention.
Figure 4:
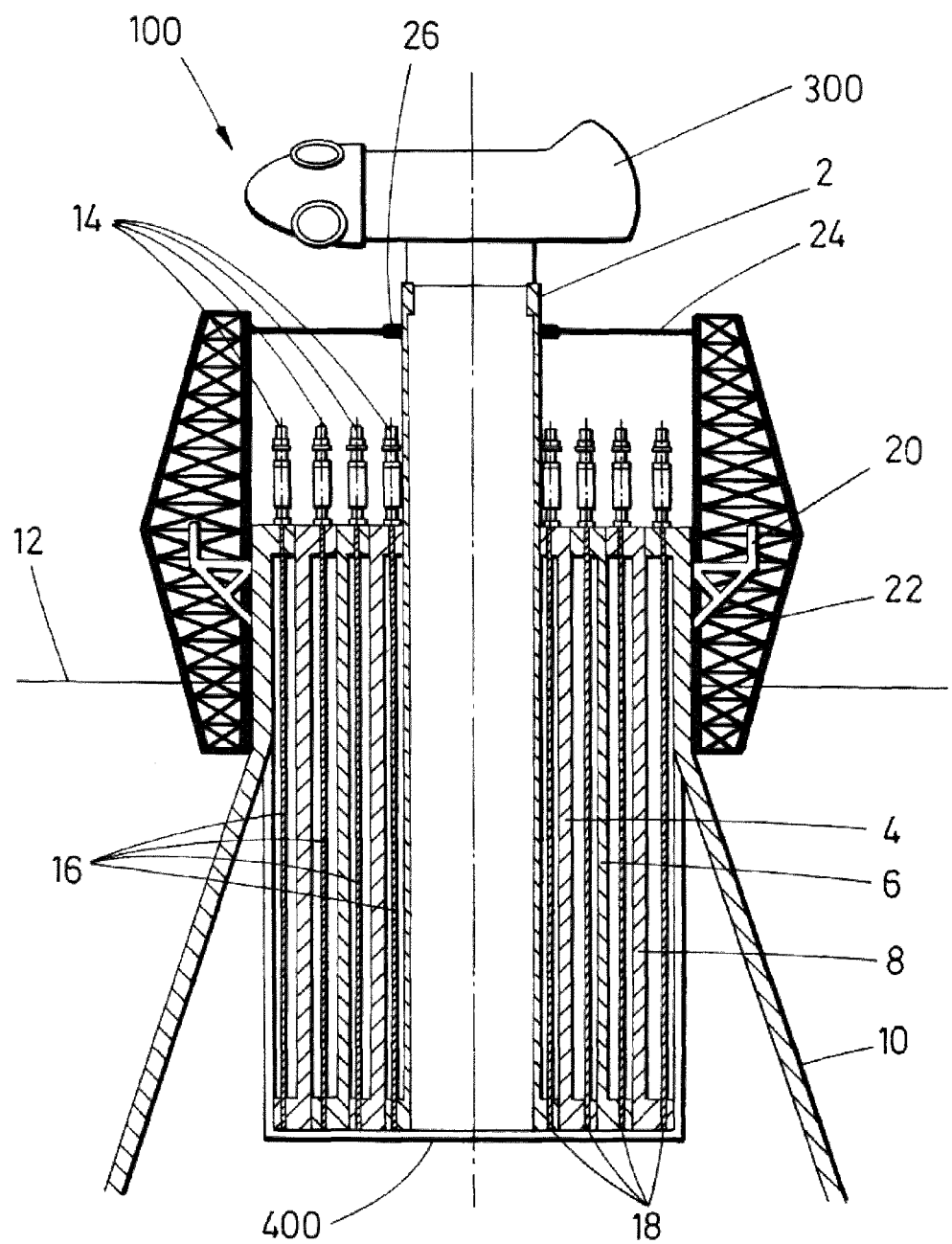
FIG. 4 shows an elevation view of a detail of FIG. 2A.

More specifically, after providing said sections 2, 4, 6, 8, 10 in an initial position wherein said base section 10 is vertically disposed resting on said assembly surface 200 and said superimposed sections 2, 4, 6, 8 are disposed coaxially within said base section 10, after providing assembly means 14, 16, 18 capable of selectively lifting said superimposed sections 2, 4, 6, 8, after providing operator support means 20 on the external surface of said base section 10 essentially vertically in correspondence with the upper edge of said base section 10, and after providing guide means 22, 24, 26 on the external surface of said base section 10, all as shown in FIG. 2A and in the detail of FIG. 4, said superimposed sections 2, 4, 6, 8 are lifted.

In this embodiment wherein the tower 100 is an off-shore tower, it is preferred that said operator support means 20 are disposed above the maximum sea level foreseen.

In accordance with the process of the present invention, the upper superimposed section 2 is first lifted followed by the superimposed section 4.

Specifically, FIG. 2B shows a stage of the process in accordance with this embodiment of the present invention wherein the upper superimposed section 2 has been totally lifted and immobilized to the superimposed section 4, the superimposed section 4 has been totally lifted, and a joint has been formed between the lower end portion of said superimposed section 4 and the upper end portion of the superimposed section 6, radially external and immediately adjacent in relation to said superimposed section 4, said joint being situated essentially vertically in correspondence with said operator support means 20.

FIG. 2C shows a later stage of the process in accordance with this embodiment of the present invention wherein the upper superimposed section 2 has been totally lifted and immobilized to the superimposed section 4, the superimposed section 4 has been totally lifted and immobilized to the superimposed section 6, the superimposed section 6 has been totally lifted, and a joint has been formed between the lower end portion of said superimposed section 6 and the upper end portion of the superimposed section 8, radially external and immediately adjacent in relation to said superimposed section 6, said joint being situated essentially vertically in correspondence with said operator support means 20.

Finally, FIG. 2D shows a later stage of the process in accordance with this embodiment of the present invention wherein all the superimposed sections 2, 4, 6, 8 have been totally lifted and immobilized to the external and immediately adjacent section, 4, 6, 8, 10 respectively, the support means 400 of sections remaining empty. This process in accordance with an embodiment of the present invention includes an additional step of removing the operator support means 20, and may still include a further additional step of removing the support means 400 of sections and/or an additional step of removing the assembly means 14, 16, 18.

As can be seen in FIG. 4, said assembly means include, for each superimposed section 2, 4, 6, 8: two cables 16 which connect the lower end portion of each of said superimposed sections 2, 4, 6, 8 and the upper end portion of the radially external and immediately adjacent section, 4, 6, 8, 10 respectively; limiter means 18, in this embodiment a wedge disposed in the lower end of the cable 16 and a stop plate containing the wedge, to fix each of said cables 16 to each lower end portion; and traction means 14, in this embodiment a jack fixed in the upper end of each cable 16, to pull upward each cable 16 and this, in turn, each lower end portion. Said traction means 14 may comprise a plurality of jacks each installed in the upper end of each cable 16 (as shown) or may comprise a smaller number of jacks than cables, the available jacks being successively installed in the upper end of each cable 16. The basic concept of these means 14, 16, 18 is known in the state of the art, for example through said document WO 2011/006526 A1, and shall not be explained here in greater detail.

As can also be seen in FIG. 4, said guide means include: two fixing members 22, in this embodiment lattice girders disposed vertically, situated in diametrically opposite positions, fixed by a lower portion to the external surface of said base section (10) so that it extends upward beyond the upper edge of said base section 10; two tensioning members 24, in this embodiment rods disposed horizontally, which each emerge from each one of said girders 22 in a position above the upper edge of said base section 10; and two displacement elements 26, in this embodiment wheels, each disposed at the free end of each of said rods 24. Said rods 24 are disposed to press said wheels 26 against the superimposed section 2, 4, 6, 8 which is being lifted at any given time, and to guide the section in question throughout the desired trajectory.

In the event that the guide means are formed by discrete structures identical or technically equivalent to the discrete structures 22, 24, 26 of this embodiment, preferably at least three of said structures will be provided and preferably said structures will be distributed equidistantly along the circumference of the base section of the tower.

Naturally, maintaining the principle of the present invention, the embodiments and construction details may largely vary from those described and illustrated purely by way of non-limiting example, without, due to this, departing from the scope of the present invention as defined in the attached claims.

In particular, by way of non-limiting illustration, although the preceding description has been made in relation to a telescopic tower which supports a wind turbine, the process in accordance with the present invention is not limited to this type of towers.

Likewise, by way of non-limiting illustration, although the preceding description has been made in relation to a telescopic tower that rests on an assembly surface of a foundation, the process in accordance with the present invention is not limited to towers that rest on a foundation.

Also by way of non-limiting illustration, although the preceding description has been made in relation to a telescopic tower comprising support means of sections that maintain the sections in initial position at a certain distance from the assembly surface, in the process in accordance with the present invention the sections, or part of them, in initial position may directly rest on the assembly surface. In the embodiments described above, said limiter means 18 (wedge disposed in the cable 16 and stop plate containing the wedge) could therefore be disposed in the upper end of each cable 16, and said traction means 14 (jack fixed at the end of the cable 16) could therefore be disposed in the lower end of each cable 16. Nevertheless, according to the process in accordance with the present invention, in the embodiments described above the assembly of said traction means 14 or any other technically equivalent means are preferred in the upper end of said cables 16, to enable that the operators housed in the operator support means 20 have direct access to said traction means 14.

Finally, also by way of non-limiting illustration, although the preceding description has been made in relation to a telescopic tower comprising assembly means including cables and jacks, the process in accordance with the present invention is not limited to this type of towers. For example, the assembly means may include push jack means that rest on the assembly surface and simply push each superimposed section according to the process of the present invention, or the assembly means may include a rack turret in the centre of the tower and at least one pinion that moves throughout the corresponding racks of the rack turret and simply pushes each superimposed section according to the process of the present invention.

The invention claimed is:

1. Assembly process of a telescopic tower including at least one prefabricated concrete section, comprising a base section and a plurality of superimposed sections, wherein:
    the diameter of said base section is greater than the diameter of said superimposed sections,
    one of the superimposed sections is a top superimposed section supporting a wind turbine,
    the base section comprises an upper end portion, and
    the superimposed sections comprise upper end portions and lower end portions, characterized in that it comprises the following steps:
    a) providing the superimposed sections and the base section in an initial position wherein said base section is vertically disposed resting on an assembly surface and said superimposed sections are disposed coaxially within said base section, and wherein the upper end portion of the base section and the upper end portions of all the superimposed sections except the top superimposed section are arranged at the same height level;
    b) providing self-climbing assembly means capable of selectively lifting said superimposed sections, wherein said self-climbing assembly means comprise:
        a set of cables which connect the lower end portion of each of said superimposed sections and the upper end portion of the radially external and immediately adjacent section;
        a limiter means to fix each of said cable to each lower end portion of the superimposed sections; and
        a set of jacks arranged at the upper end portion of the base section and the upper end portions of the superimposed sections except the top superimposed section and connected to said cables, wherein a number of said jacks is smaller than said cables so that at least one of the jacks is successively connected to more than one cables and reusable for lifting more than one superimposed sections;
    c) providing operator support means on the external surface of said base section essentially vertically in correspondence with an upper end portion of said base section;
    d) lifting the innermost superimposed section radially from those that are in the initial position, by said assembly means, to an assembly position wherein a lower end portion of said superimposed section which is being lifted is situated essentially vertically in correspondence with an upper end portion of a radially external and immediately adjacent section in relation to said section which is being lifted, thus forming a joint between the lower end portion of said superimposed section which is being lifted and the upper end portion of the radially external and immediately adjacent section relation o said section which is being lifted, said joint being thus situated essentially vertically in correspondence with said operator support means;
    e) providing anchoring devices in said joint, for immobilizing at least provisionally the corresponding sections between one another, by operators housed in said operator support means;
    f) repeating steps d) and e) for the sequential lifting and immobilization of the remaining superimposed sections that are in the initial position, from the innermost to the outermost section radially;
    wherein the operator support means are maintained at the s position in he base section invariably during steps d) to f),
    wherein the operator support means enable the housing of operators that from said invariable position have direct access to said jacks used for the successive operations of lifting all the different superimposed sections of the tower through steps d) and f),
    wherein the operator support means enable the housing of operators that from said invariable position have direct access to anchoring devices used for the successive operations of immobilization of all the different superimposed sections of the tower through steps e) and f);
    g) removing the operator support means from the external surface of the base section after step f).

2. Assembly process of a telescopic tower according to claim 1, wherein said telescopic tower comprises guide means to guide the section which is being lifted along a predetermined trajectory.

3. Assembly process of a telescopic tower according to claim 2, wherein said guide means includes:
   at least one fixing member, fixed by a lower portion to the external surface of said base section so that it extends upward beyond the upper edge of said base section,
   at least one tensioning member which emerges from said fixing member in a position above the upper edge of said base section, and
   at least one displacement element disposed in the free end of said tensioning member;
   said tensioning, member being disposed to press said displacement element against a superimposed section which is being lifted.

4. Assembly process of a telescopic tower according to claim 3, wherein said fixing member a lattice girder and/or said tensioning members a rod and/or said displacement member is a wheel.

5. Assembly process of a telescopic tower according to claim 4, wherein said rod is of adjustable length.

6. Assembly process of a telescopic tower according to claim 1, wherein after step f) the process is carried out inversely in order to dismantle said telescopic tower.

* * * * *

UNITED STATES PATENT AND TRADEMARK OFFICE
CERTIFICATE OF CORRECTION

PATENT NO. : 10,465,411 B2
APPLICATION NO. : 14/363421
DATED : November 5, 2019
INVENTOR(S) : Miguel Angel Fernandez Gomez and Jose Emilio Jimeno Chueca It is certified that error appears in the above-identified patent and that said Letters Patent is hereby corrected as shown below:

On the Title Page

Item (73) Assignee:
Delete "ESTEYCO S.A.P., MADRID (ES)"
And insert -- SEA WIND TOWERS, S.L., MADRID (ES)
      ESTEYCO S.A.P., MADRID (ES) --

Signed and Sealed this
Twenty-fourth Day of December, 2019

Andrei Iancu
*Director of the United States Patent and Trademark Office*